Patented June 2, 1953

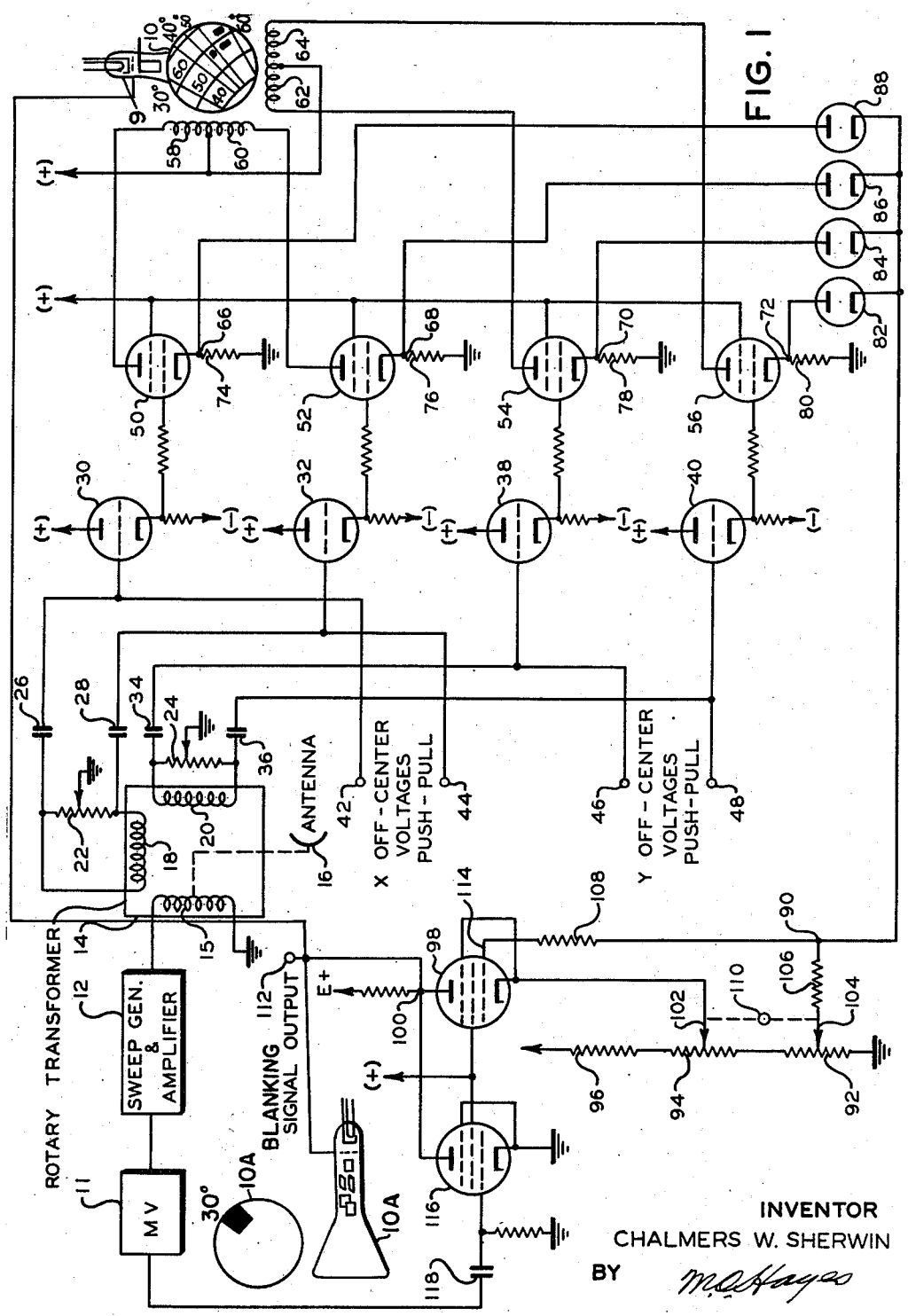

2,640,984

UNITED STATES PATENT OFFICE 2,640,984

GATING SYSTEM FOR PLAN POSITION INDICATORS

Chalmers W. Sherwin, Leonia, N. J., assignor, by mesne assignments, to the United States of America as represented by the Secretary of the Navy Application April 18, 1946, Serial No. 662,984

4 Claims. (Cl. 343—11)

This invention relates to gating of fixed coil off-center plan position indicators, and more specifically to means for blanking all but a selected area of the screen on such an indicator.

In certain radar applications it is desirable to present the data obtained on several indicators and have each operator view only a selected area of the total area searched. Plan position indicators operated with their center displaced so that only a portion of the plot is presented have been used for this purpose. Difficulties have arisen in operating indicators in this manner due to irregular illumination of said indicators when the electron beam is deflected off the face of the indicator. It is also necessary to know what areas are being searched by each operator to know that the total area desired is being covered.

It is therefore an object of this invention to provide a means of blanking all but a selected area on a plan position indicator whether it is operating normally or off-center.

Another object of this invention is to provide a means of indicating on another indicator the area that is not blanked on said plan position indicator.

To accomplish the foregoing general objects, and more specific objects which hereinafter appear, my invention resides in the circuit elements and their relation one to another, as are more particularly described in the following specification. The specification is accompanied by a drawing in which:

Fig. 1 is a diagram illustrating a form of the invention.

The invention will now be described in detail with reference to Fig. 1 which shows a conventional type fixed coil plan position indicator and associated sweep circuits which have been modified to include features of this invention. The operation of the entire circuit will be discussed with emphasis on the features of this invention to provide a clearer description of its operation.

Multivibrator 11 is triggered from the radar timer, not shown, and generates gates of durations corresponding to the maximum ranges used. Multivibrator 11 in turn triggers sweep generator and amplifier 12 which develops a trapezoidal voltage with a duration equal to the gate from multivibrator 11 which trapezoidal voltage is applied to the rotor 15 of rotary transformer 14. Rotor 15 is turned with scanning antenna 16. Voltages are induced in windings 18 and 20 of rotary trasnformer 14 from the rotor 15. As the rotor 15 is turned with antenna 16 the voltage in the windings 18 and 20 will also vary in proportion to the position of antenna 16. Resistors 22 and 24 provide center tapped ground connections to the outputs from windings 18 and 20. The output from winding 18 is applied through capacitors 26 and 28 to the grids of cathode followers 30 and 32 respectively. Similarly the output from winding 20 is applied through capacitors 34 and 36 to the grids of the remaining cathode followers 38 and 40.

Off-centering voltages for deflecting the center horizontally are applied in push pull at terminals 42 and 44 to the grids of cathode followers 30 and 32. Similarly off centering voltages for deflecting the center vertically are applied in push-pull at terminals 46 and 48 to the grids of cathode followers 38 and 40. The output from each cathode follower 30, 32, 38 and 40 is taken off from each cathode and applied to the respective grids of driver tubes 50, 52, 54 and 56. Cathode followers 30, 32, 38 and 40 serve to prevent the flow of grid current in driver tubes 50, 52, 54 and 56 from charging the capacitors 26, 28, 34 and 36 to upset the operation of the centering circuits.

The trapezoidal voltages thus applied to the grids of driver tubes 50, 52, 54 and 56, varying in amplitude with the position of antenna 16 and rotor 15, produce linear sweep currents in each of the driver tubes 50, 52, 54 and 56 which vary with the position of antenna 16. These sweep currents flow through the deflection coils 58, 60, 62 and 64 and deflect the indicator electron beam radially in a direction corresponding to that of antenna 16.

In certain applications it is desired to view only a selected area around the center of the screen, or in off-center operation it is desirable to view a small area of the total polar plot at an expanded scale. In off-center operation the electron beam is often displaced off the face of the tube in order to get the desired area on the screen. When the electrons are deflected so far they often hit the neck of the cathode ray indicator and are deflected onto the screen to produce undesirable illumination.

When the electron beam is at the center of the indicator 10 the currents through each driver tube 50, 52, 54 and 56 will be practically identical. Thus the voltage at each cathode 66, 68, 70 and 72 will be the same since each voltage is equal to the drop across the equal cathode resistors 74, 76, 78 and 80. As the beam is deflected across the face of indicator 10 the current in the appropriate coils will increase and when the beam is deflected a definite amount to the left or right or up and down the current flow through one of the driver tubes will have increased to a point where the voltage drop across its cathode resistor will bring the voltage, say cathode 72 of driver tube 76 for example, to the voltage level at the cathode of diode 82. Since the plate of diode 82 is tied to cathode 72, when this occurs, diode 82 will conduct. As shown in Fig. 1 cathode 66 of driver tube 50 connects to the plate of diode 88, cathode 68 of driver tube 52 connects to the plate of diode 86, cathode 70 of driver tube 54 connects to the plate of diode 84, and as explained above cathode 72 of driver tube 56 connects to the plate of diode 82. The cathodes of diodes 82, 84, 86 and 88 tie in common to point 90. Now whenever the voltage on any cathode 66, 68, 70 or 72 exceeds the voltage at point 90 the appropriate diode 82, 84, 86 or 88 will conduct and raise the voltage at point 90.

Switch tube 98 obtains its cathode voltage and grid voltage from the voltage divider composed of resistors 92, 94, and 96. The cathode of switch tube 98 receives its potential at variable contact 102 on resistance 94 while the grid of tube 98 obtains its voltage through resistors 106 and 108 from variable contact 104 on resistor 92. The voltage on the grid of tube 98 is just enough below the voltage of the cathode to keep tube 98 normally cut-off. Contacts 102 and 104 are tied mechanically to the one control 110 so that no matter what level the grid and thus point 90 are set the cathode voltage will be enough higher to keep switch tube 98 cut-off. Thus the voltage on the plate of tube 98 at point 100 will normally be equal to the applied voltage E+. This is applied to control grid 9 to bias the electron beam of indicator tube 10 to conduction under normal conditions when the electron beam is on the face of indicator 10. Whenever the electron beam moves to one side of the indicator 10 one of the diodes 82, 84, 86 or 88 will conduct and bring the voltage of point 90 and thus grid 114 up to make switch tube 98 conduct. (Resistor 108 serves to protect grid 114 when grid current flows.) This will cause the voltage at point 100 and terminal 112 to drop and the signal being fed to indicator 10 will bias the electron beam to cut-off so it cannot reflect off the neck of the tube to produce undesired illumination on the screen. Thus it may be seen that as long as the electron beam is directly on the selected area of the screen on indicator 10 switch tube 98 will be cut-off and the indicator 10 will be unblanked but when the electron beam goes outside the area on the face of the indicator tube 98 will conduct and supply a blanking pulse to the indicator 10 at terminal 112. The size of the square area presented on indicator 10 may be varied by changing the voltage level at point 90 by means of control 110.

Switch tube 116 receives a gate from multivibrator 11 which is coupled through capacitor 118 to the grid of the tube 116. This gate causes tube 116 to conduct during the fly-back time of each sweep on indicator 10 and prevents the trace from appearing on indicator 10 during fly-back time. It also eliminates the spot from the indicator 10 if it should be on the indicator screen during the "wait" period between sweeps.

As already explained the voltage at point 100 and thus the output voltage at terminal 112 will be equal to E+ while switch tube 98 is cut-off during a sweep but while the sweep is in the area presented on indicator 10 this voltage will be reduced. This voltage may then be used to intensify by biasing to conduction the cathode ray tube of another indicator 10A, the area which is being viewed on indicator 10 thus another operator can tell what area is being covered by indicator 10.

It is believed that the construction and operation as well as the advantages of my improved indicator gating circuit will be apparent from the foregoing detailed description thereof. It will also be apparent that while I have shown and described my invention in a preferred form changes may be made in the circuit disclosed without departing from the spirit of the invention as sought to be defined in the following claims.

What is claimed is:

1. In a radar system employing fixed coil type plan position indicators, a first cathode ray tube, means for sweeping the screen of said first cathode ray tube with an electron beam for presenting radar data on said screen, means for offcentering the origin of the sweep of said first cathode ray tube to present a selected area on said screen, a second cathode ray tube, means for sweeping the screen of said second cathode ray tube with an electron beam for presenting radar data on said screen, means for positioning the origin of said last mentioned sweep substantially at the center of said second cathode ray tube, means for intensifying said electron beam in said first cathode ray tube during the time of directly striking the screen thereof, said means being operative to provide an output applicable with radar data to said second cathode ray tube, thereby producing a bright area on the screen of said second cathode ray tube, indicating the area presented on said first cathode ray tube.

2. In a plan position indicator employing a cathode ray tube with fixed deflection coils and four driver tubes, means including said driver tubes for sweeping the screen of said cathode ray tube with an electron beam, means for presenting radar data on the screen of said tube, means for offcentering the origin of said sweep to present a selected area on said screen, means employing separate diodes responsive to each of the outputs of said driver tubes for determining the deflection of said electron beam in any direction from the center of said screen, means employing a first switch tube for blanking said electron beam of said cathode ray tube whenever said electron beam is deflected a predetermined distance in any direction, means employing a second switch tube to blank out said cathode ray tube during the period between sweeps and during the fly back time of each sweep, and means employing a potentiometer for adjusting the distance said electron beam may travel across said screen from the center of said cathode ray tube to adjust the area of said radar data presentation.

3. In a cathode ray tube having a fixed coil type deflection system, means for energizing said deflection system to cause the beam of said tube to trace a predetermined scanning pattern, means to shift the center of said scanning pattern off the center of the screen of said tube to present a selected area of said pattern on said screen, a normally nonconducting switch tube for biasing said cathode ray tube and means responsive to the current flow in said deflection system for biasing said switch tube to conduction thereby biasing said cathode ray tube to nonconduction whenever said currents deflect said beam off said screen.

4. A circuit for controlling the intensity of the beam of a cathode ray tube having a fixed coil type deflection system comprising, means biasing said cathode ray tube to be normally conducting, means for energizing said deflection system to cause said beam to trace a predetermined scanning pattern, means for off centering the origin of said scanning pattern on said screen to present a selected area of said pattern, a switch tube biased to be normally nonconducting and connected upon conduction to bias said cathode ray tube to nonconduction, and means responsive to the current flow in said deflection system to bias said switch tube to conduction for current amplitudes deflecting said beam off said screen.

CHALMERS W. SHERWIN.

References Cited in the file of this patent

UNITED STATES PATENTS

| Number | Name | Date |
|---|---|---|
| 2,400,791 | Tolson | May 21, 1946 |
| 2,401,432 | Luck | July 4, 1946 |
| 2,409,456 | Tolson | Oct. 15, 1946 |
| 2,421,747 | Englehardt | June 10, 1947 |
| 2,531,466 | Ranger | Nov. 28, 1950 |